US00RE35951E

United States Patent [19]

Ganesan et al.

[11] E Patent Number: Re. 35,951

[45] Reissued Date of Patent: Nov. 10, 1998

[54] CMOS VOLTAGE REFERENCE WITH STACKED BASE-TO-EMITTER VOLTAGES

[75] Inventors: Apparajan Ganesan, Austin, Tex.; Robert J. Libert, Rowley, Mass.

[73] Assignee: Analog Devices, Inc., Norwood, Mass.

[21] Appl. No.: 266,961

[22] Filed: Jun. 27, 1994

Related U.S. Patent Documents

Reissue of:

[64] Patent No.: 5,126,653
Issued: Jun. 30, 1992
Appl. No.: 590,655
Filed: Sep. 28, 1990

[51] Int. Cl.[6] ..... G05F 3/24

[52] U.S. Cl. ..... 323/313; 323/314; 327/538; 327/543; 365/189.09

[58] Field of Search ..... 323/312, 313, 323/314, 315, 316; 365/189.09; 327/538, 543

[56] References Cited

U.S. PATENT DOCUMENTS

| | | | |
|---|---|---|---|
| 4,595,874 | 6/1986 | Hein et al. | 323/312 |
| 4,622,512 | 11/1986 | Brokaw . | |
| 4,896,094 | 1/1990 | Greaves et al. | 323/314 |

OTHER PUBLICATIONS

Michejda and Kim, JSSC, Dec. '84, p. 1015.
Kuijk, JSSC Jun. '73, pp. 223–226.
Gray and Meyer, "Analysis & Design of Analog Integrated Circuits", pp. 734, 735.

*Primary Examiner*—Adolf Berhane
*Attorney, Agent, or Firm*—Parmelee & Bollinger, LLP

[57] ABSTRACT

A band-gap voltage reference forming part of a CMOS IC chip. A $\Delta V_{BE}$ voltage is developed by stacked pairs of parasitic bipolar transistors, with the transistors of each pair operated at different current densities. MOS buffer transistors are connected at corresponding ends of the stacks where the $\Delta V_{BE}$ voltage is developed. The bipolar transistors are driven by MOS current sources.

24 Claims, 4 Drawing Sheets

CMOS VOLTAGE REFERENCE WITH STACKED BASE-TO-EMITTER VOLTAGES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to voltage reference circuits of the band-gap type. More particularly, this invention relates to band-gap circuits suited for use with CMOS integrated-circuit (IC) chips.

2. Description of the Prior Art

Band-gap voltage regulators have been used for a number of years for developing reference voltages which remain substantially constant in the face of temperature variations. Such circuits generally develop a voltage proportional to the difference between base-to-emitter voltages ($\Delta V_{BE}$) of two transistors operated at different current densities. This voltage will have a positive temperature coefficient (TC), an is combined with a $V_{BE}$ voltage having a negative TC to provide the output signal which varies only a little with temperature changes. Reissue Pat. RE. No. 30,586 (A. P. Brokaw) shows a particularly advantageous band-gap voltage reference requiring only two transistors.

Band-gap reference circuits have primarily been employed in bipolar ICs. Efforts have been made to adapt such references for CMOS ICs, but significant problems have been encountered in those efforts. As a result, the devices proposed for CMOS have suffered important defects, particularly undue complexity.

One serious problem results from the fact that the $\Delta V_{BE}$ voltage is quite small (e.g. less than 100 mV), so that it must be amplified quite a bit to reach a value suitable for reference purposes. Such amplification is inherent in a band-gap circuit such as shown in U.S. Pat. No. 30,586 referred to above, because the $\Delta V_{BE}$ signal is taken from the collectors of the two transistors. In a CMOS chip made by the usual processes, however, the bipolar transistors available for voltage reference purposes are parasitic transistors, the collectors of which cannot be independently accessed for voltage sensing purposes. In such devices, therefore, the $\Delta V_{BE}$ voltage will not automatically be amplified by the transistors from which it is developed.

Moreover, the MOS amplifiers on a CMOS chip have relatively large offset voltages, so that the offset after substantial amplification will show up as a large error compared to the $\Delta V_{BE}$ signal component. For example, to develop a reference voltage of around 5 volts, a 20 mV offset in an amplifier (or comparator) could show up as a 0.5 volt error referred to output or threshold.

U.S. Pat. No. 4,622,512 (Brokaw) shows an arrangement for multiplying the $V_{BE}$ of each of two transistors having different current densities by connecting resistor-string $V_{BE}$ multipliers to each of the two transistors. This is an effective approach to the problem, but is not fully satisfactory for all applications.

SUMMARY OF THE INVENTION

In one preferred embodiment of the invention, to be described hereinafter in detail, the voltage reference comprises four pairs of parasitic bipolar transistors with the individual transistors of each pair operated at different current densities. The four low-current-density transistors of these pairs form one sub-set, and are interconnected in a string-like or "stacked" arrangement so that their $V_{BE}$'s add together cumulatively. The four high-current-density transistors are similarly interconnected as a second sub-set.

End transistors of each string are connected together in such a way as to develop the total cumulative $\Delta V_{BE}$ voltage for both strings of transistors. By arranging the transistors of each sub-set to have equal current densities, the net $\Delta V_{BE}$ voltage will be four times as large as that obtained with a single pair of transistors operated at such different current densities. Such a large $\Delta V_{BE}$ voltage makes possible the development of a stable and precise reference voltage on a CMOS IC chip.

The preferred embodiment to be described further includes MOS transistors interconnected with the parasitic bipolar transistors to provide improved operating characteristics. In a second embodiment of the invention, two (or more) strings of opposite-polarity transistors (e.g., NPN vs. PNP) are added to the original two strings to further build up the magnitude of the total $\Delta V_{BE}$ voltage.

Other objects, aspects and advantages of the invention will in part be pointed out in, and in part apparent from, the following description of the preferred embodiments of the invention, considered together with the accompanying drawings.

DETAILED DESCRIPTION OF PREFERRED EMBODIMENTS OF THE INVENTION

Figure 1:
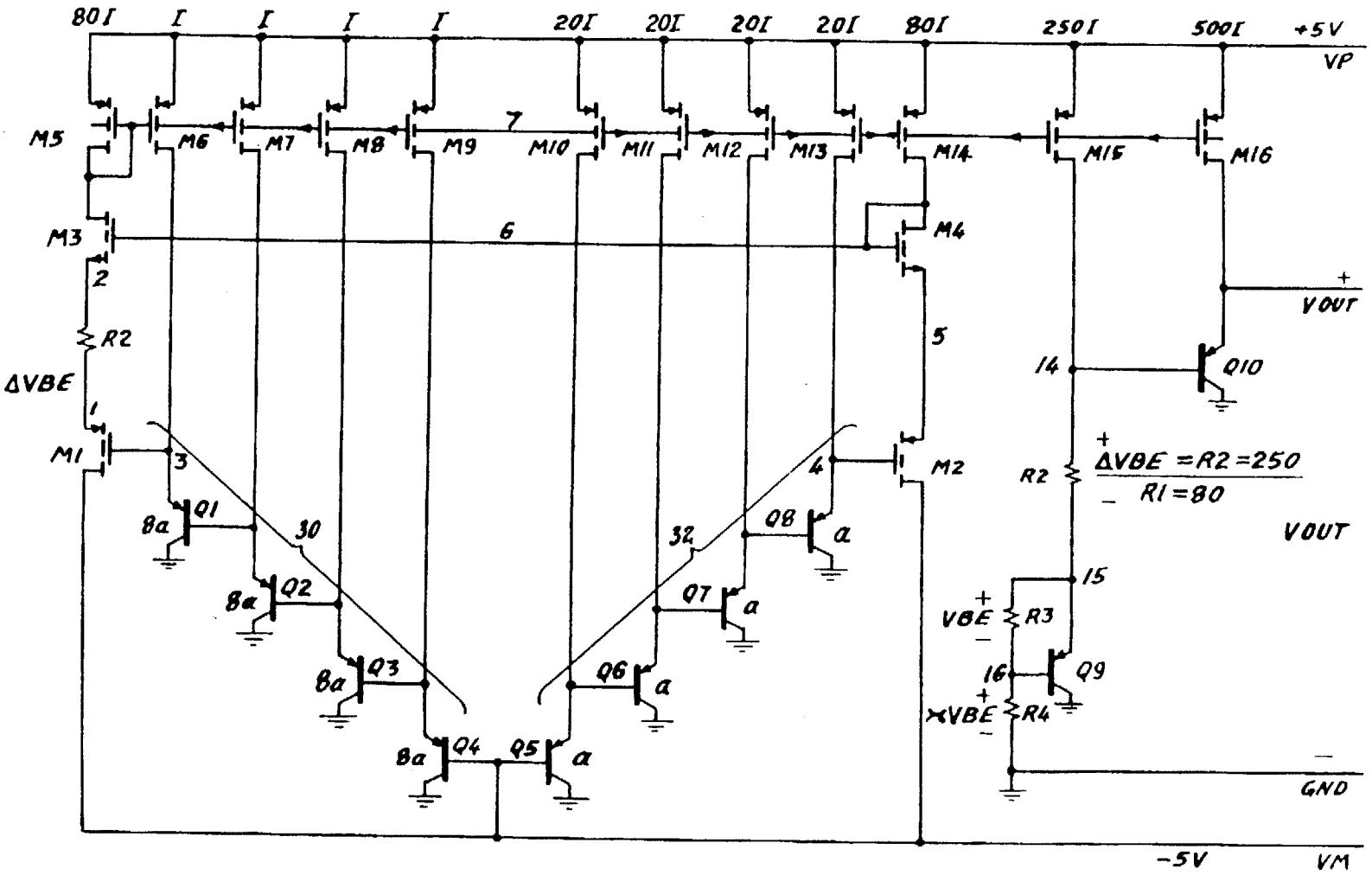
FIG. 1 is a circuit diagram showing, in somewhat simplified form, one preferred embodiment of the invention.

Referring now to FIG. 1, the voltage reference forming part of a CMOS IC chip comprises four pairs of parasitic bipolar PNP transistors Q4, Q5; Q3, Q6; Q2, Q7; and Q1, Q8. The left-hand transistors of these pairs form one sub-set 30 of transistors which, in this embodiment, are all identical. Each transistor of this sub-set is supplied with current from a corresponding current source in the form of a PMOS transistor (M6, M7, M8, M9) having its drain connected to the emitter of the associated bipolar transistor (Q1, Q2, Q3, Q4). These four PMOS current sources are identical, and in this embodiment each furnishes the corresponding bipolar transistor with a current I of one μA.

The right-hand transistors Q5–Q8 of the four transistor pairs form a second sub-set 32 of identical transistors each of which is supplied with a current of 20 μA by a respective PMOS current source M10–M13. The emitter areas of these transistors are one-eighth the emitter areas of the transistors Q1–Q4. Thus, the current density of the transistors in the second sub-set is 160 times the current density of the first sub-set of transistors. For any different-current-density pair of these transistors, the difference in $V_{BE}$ voltages will be:

$$\Delta V_{BE} = \frac{KT}{Q} \ln 160$$

or 0.131 volts.

The bipolar transistors of each of the two sub-sets 30, 32 are interconnected in a string arrangement wherein the emitter of one transistor is connected to the base of the next adjacent transistor. The collectors of all of the transistors are connected to the chip substrate, as indicated by the three-pronged symbol; the substrate is maintained at the negative supply voltage (in this case −5V). With the emitter-to-base string interconnection shown, the $V_{BE}$ voltages of the individual transistors add together cumulatively. By connecting together the bases of the two transistors (Q4, Q5) at a common end of the two strings of transistors, a net cumulative $\Delta V_{BE}$ voltage will be developed between circuit points 3 and 4 at the two transistors (Q1, Q8) at the opposite ends of the strings. This net voltage will be four times the $\Delta V_{BE}$ voltage for any single pair of the transistors, or about 0.525 volts.

The potentials at circuit points 3 and 4 are connected respectively to the gates of two PMOS transistors M1, M2, which act as a buffer circuit along with M3 and M4. With this arrangement, the potential at circuit point 4 is effectively transferred to circuit point 2 at the upper end of a resistor R1 in series with the left-hand buffer transistor M1. Thus the voltage across R1 will be the net $\Delta V_{BE}$ voltage of (about) 0.525.

The resulting current through R1 is PTAT (proportional to absolute temperature) because it is produced by a $\Delta V_{BE}$ voltage. This current is mirrored through M5 to M15 with a ratio producing an M15 current of 2501 (i.e., about 250 μA). This latter current flows through a resistor R2, and through a PNP transistor Q9 and series resistors R3, R4. The lower end of resistor R4 is connected to ground, which is the reference terminal for the final output voltage (that is, the ground terminal is midway between the +5V and −5V supply voltages).

The voltage across resistor R2 is, in the preferred embodiment described herein, given by the following expression:

$$V_{R2} = \frac{(\Delta V_{BE})(R2)(250)}{(R1)(80)}$$

In one preferred embodiment R2=5.13K, and R1=6.565K.

The upper end of resistor R2 is connected to the base of a PNP transistor Q10. This transistor is supplied with current by a PMOS transistor M16, producing a current of 500 I. The emitter of Q10 is connected to the voltage reference output terminal which produces an output voltage $V_{OUT}$ as follows:

$$V_{OUT} = V_{BE}10 + V_{BE}9(1 + X) + \frac{(\Delta V_{BE})(R2)(250)}{(R1)(80)}$$

In the preferred embodiment, R4 was one-half the size of R3, so that X=0.5

The $V_{BE}$ and $\Delta V_{BE}$ terms are so set that the variations in output voltage with changes in temperature are quite small.

The use of buffer transistors M1 through M4 permits a relatively high current to flow in the resistor R1 (i.e., 80 μA as against 1 μA in the PNP transistor Q1). This makes it possible to use a resistor value (about 6.5K) which is practicable to implement. If the 1 μA current of transistor Q1 were arranged to flow through resistor R1, in accordance with prior art concepts, the resistor would have to be about 525 K. A resistor that large would not be manageable in normal processing of an IC chip. The buffer arrangement also allows transistor Q1 to operate at low currents, minimizing Beta effects as well as obtaining high current ratios between individual transistors of each pair without requiring large supply currents.

Figure 2A:
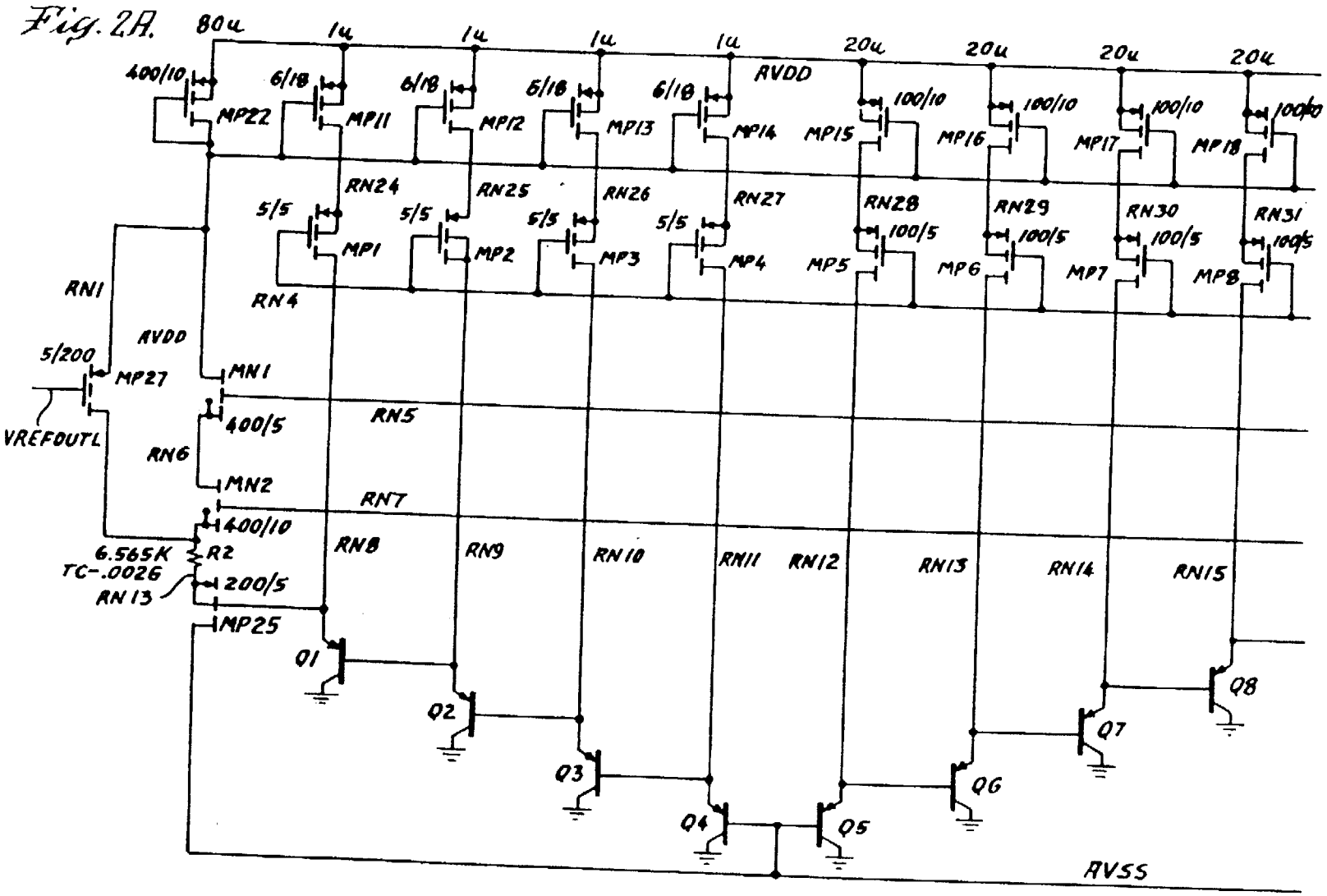
FIGS. 2A and 2B are a more detailed circuit diagram of the embodiment of FIG. 1.
Figure 2B:
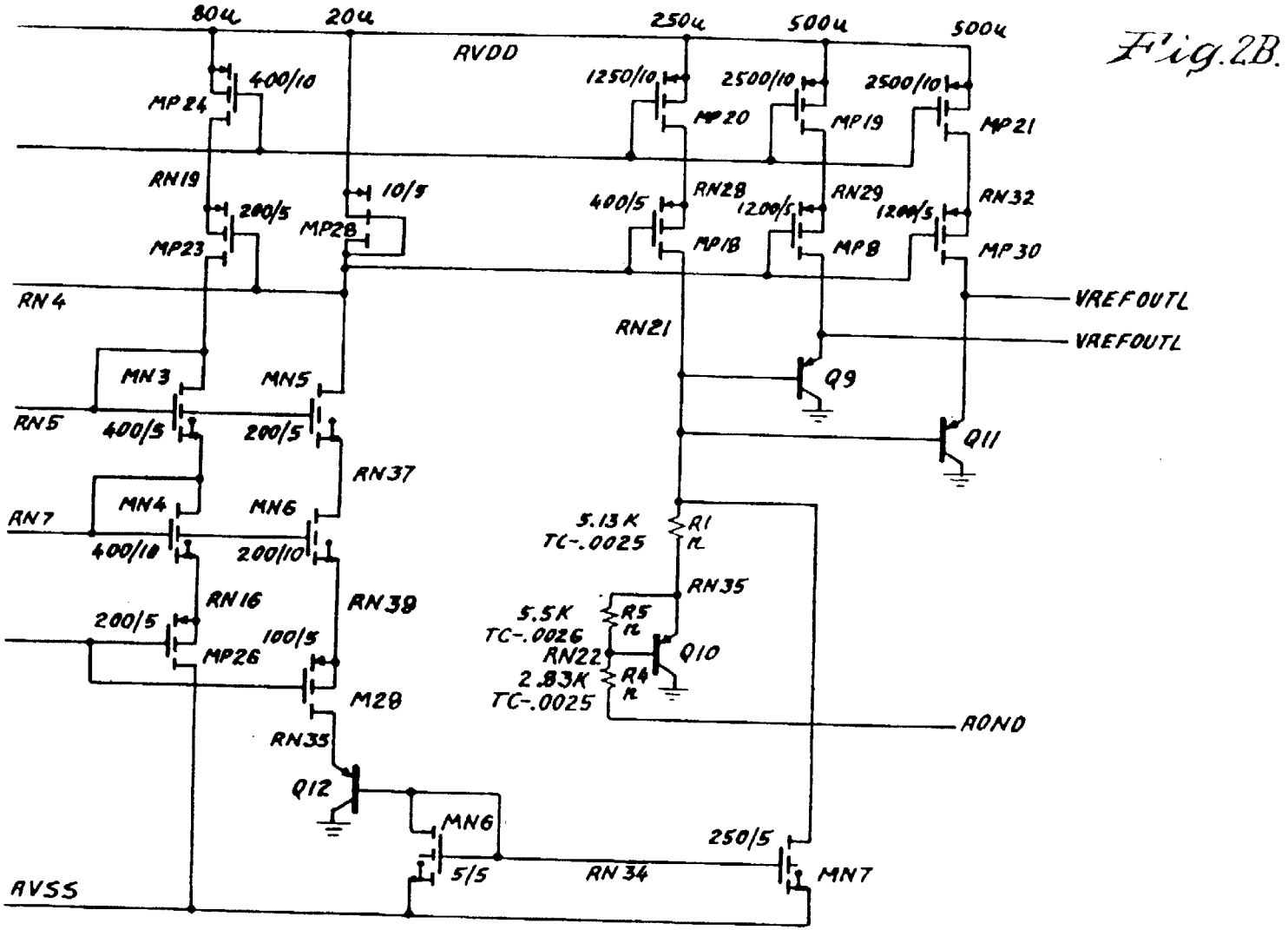

FIGS. 2A and 2B present further details of a voltage reference circuit of the type shown in FIG. 1. The designations applied to certain common elements of FIGS. 1 and 2A, 2B remain the same, for ready comparison. It will be seen that the PMOS current sources for the PNP transistors Q1, etc., actually comprise two MOS transistors (e.g., MP1, MP11), to provide increased output impedance. It also should be noted that the FIGS. 2A and 2B circuit furnishes two separate output voltage (VREFOUTL and VREFOUTR) to provide for use in two-channel stereo equipment, with minimal cross-talk between channels.

With further reference to FIGS. 2A and 2B, each of the output transistors Q9, Q11 is supplied with current through respective pairs of cascode-connected MOS transistors MP8, MP19, M30, MP21, to provide for correspondence with the similarly cascoded pairs for the $\Delta V_{BE}$ transistors Q1, Q2, etc. The output transistors Q9, Q11 will have some base current, which is potentially error-producing, and this is compensated for by a circuit including a MOS transistor MN7 connected to the upper end of R2. This transistor is part of a current mirror including MN6 which receives a base current from a bipolar transistor Q12. This base current controls correspondingly the current through MN7, thereby to produce a compensating current at the top of R2, so as to compensate for the base currents of the output transistors. Current for Q12 is supplied by M28, MN6 and MNS, corresponding to MP26, MN4 and MN3 in the right-hand side of the $\Delta V_{BE}$ summation circuit. MN5, MN6 and M28 also control the current to MP28 which sets the bias for the lower-tier row of current source transistors MP1, MP2, etc. At the left-hand edge of FIG. 2A is a start-up circuit comprising MP27; when power is applied, this circuit starts up the voltage reference circuitry and then shuts off.

Figure 3:
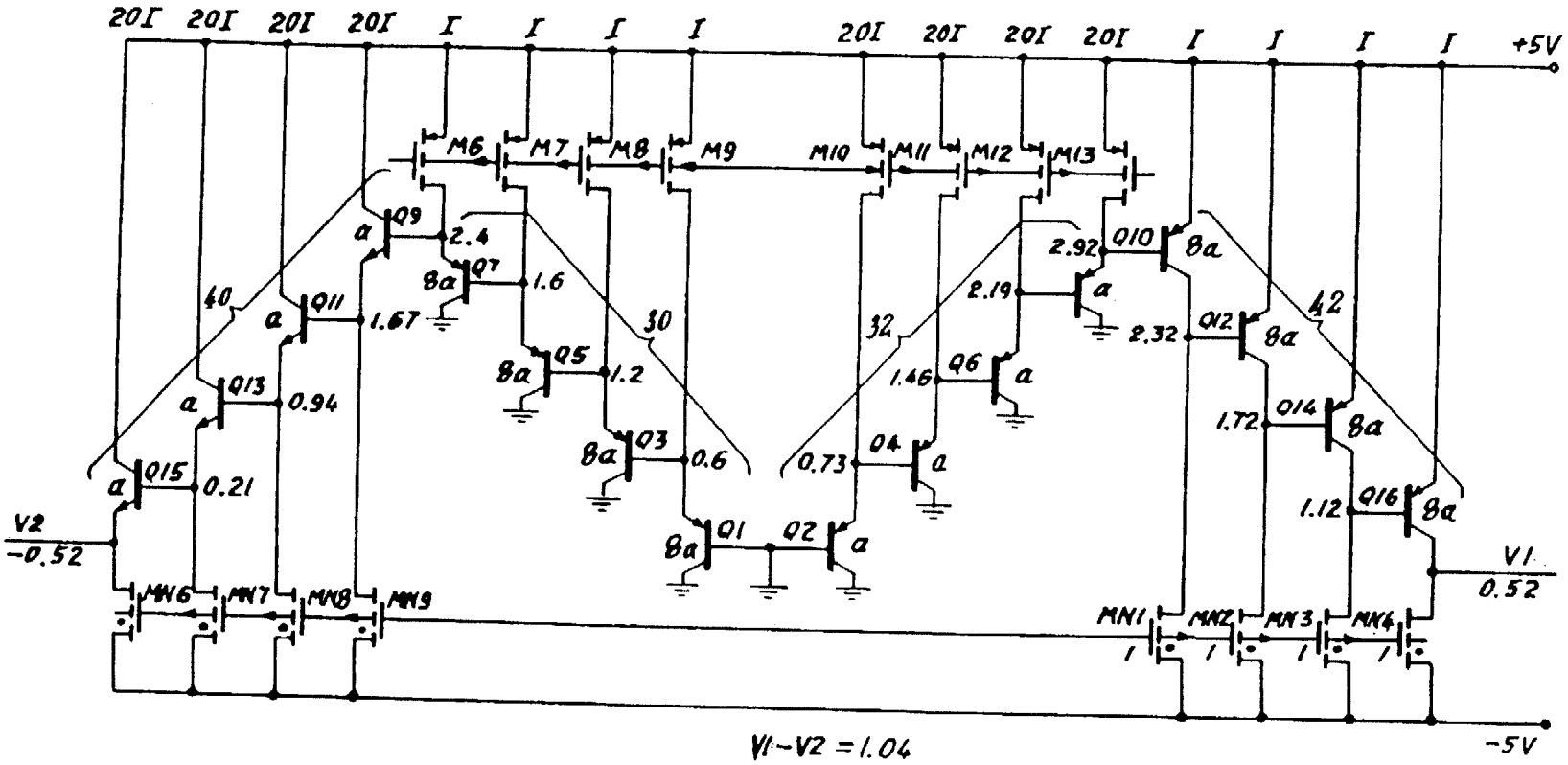
FIG. 3 is a circuit diagram, in somewhat simplified form, showing an arrangement for further increasing the magnitude of the $\Delta V_{BE}$ voltage.

It has been found that still larger $\Delta V_{BE}$ voltages can be produced by incorporating further strings of bipolar transistors. FIG. 3 shows such an arrangement, wherein two additional strings 40, 42 of NPN transistors are connected respectively to corresponding upper ends of PNP transistor strings 30, 32 as shown in FIG. 1. Because these additional transistors are NPN type, rather than PNP type as in the first two transistor strings, their operating voltages can be cascaded downwardly (starting at the upper ends of the strings) while still increasing cumulatively the net $\Delta V_{BE}$ voltage. Approximate voltages at juncture points are shown on the circuit diagram.

As in the FIG. 1 circuit, the PNP transistors 30, 32 receive current from PMOS current sources, with the left-hand string transistors receiving 1 μA each and the right-hand PNP transistors receiving 20 μA. The left-hand string emitter areas are eight times that of the right-hand string emitter areas, just as in FIG. 1.

The left-hand string of NPN transistors 40 have emitter areas equal to those of the right-hand string of PNP transistors 32 and are supplied with currents of 20 μA by corresponding NMOS current sources. The right-hand string of NPN transistors 42 have emitter area eight times that of the emitter areas of the left-hand transistor string 40, and are supplied with currents of 1 μA by corresponding NMOS current sources.

The first transistor Q9 of the left-hand NPN string 40 has its base connected to the emitter of the upper end transistor Q7 of the left-hand string of PNP transistors 30. The remaining transistors of this NPN string 40 are interconnected as before, with the emitter of one transistor connected to the base of the next adjacent transistor.

The base of the first transistor Q10 of the right-hand NPN string 42 is connected to the emitter of the upper end transistor Q8 of the right-hand PNP string 32. The remaining transistors of this NPN string are interconnected as before, with the emitter of one transistor being connected to the base of the next adjacent transistor.

With this arrangement, the net $\Delta V_{BE}$ voltage can be enlarged by the additive relationship between the four strings of transistors. In one exemplary circuit, a total $\Delta V_{BE}$ voltage of 1.04 is shown.

Although preferred embodiments of the invention have been disclosed herein in detail, it is to be understood that this is for the purpose of illustrating the invention, and should not be construed as necessarily limiting the invention since those of skill in this art can readily make various changes and modifications thereto without departing from the scope of the invention as reflected in the claims hereof.

What is claimed is:

1. In an IC chip formed with a plurality of CMOS transistors together with a plurality of parasitic bipolar transistors having two current-carrying electrodes and a base electrode; a band-gap voltage reference comprising:

a plurality of selected pairs of said bipolar transistors;

said transistor pairs being divided into two sub-sets each comprising one transistor from each pair;

current means supplying to all of the transistors of said selected pairs controlled currents having magnitudes such that the current densities of the individual transistors of each pair are different;

one like current-carrying electrode of said paired transistors being connected to a common reference potential;

the other current-carrying electrode of each of said paired transistors being connected to the base electrode of another transistor of the same sub-set to form interconnected strings of transistors making up said sub-sets;

means connecting together like electrodes of two common-end transistors of each of said strings of transistors;

resistor means;

first circuit means coupling one electrode of one of the two transistors at the ends of said strings of transistors which are opposite said common ends to one end of said resistor means; and second circuit means coupling one of the electrodes of the other of said two transistors to the other end of said resistor means, thereby to develop a $\Delta V_{BE}$ voltage across said resistor means directly from the ends of said strings of transistors.

2. A voltage reference as claimed in claim 1, wherein said bipolar transistors are PNP type.

3. A voltage reference as claimed in claim 2, wherein said like electrodes are the collector electrodes of said paired transistors.

4. A voltage reference as claimed in claim 1, wherein said like electrodes of said common-end transistors are base electrodes.

5. A voltage reference as claimed in claim 1, wherein said circuit means comprises buffer MOS transistors connected respectively to the opposite-end transistors of said strings of transistors.

6. A voltage reference as claimed in claim 5, including transistor means to develop a voltage proportional to $V_{BE}$ connected in series with said $\Delta V_{BE}$ voltage.

7. A voltage reference as claimed in claim 1, including MOS current-source transistors connected respectively in series with the individual transistors of said pairs of transistors to set the current levels therethrough.

8. A voltage reference as claimed in claim 7, wherein said current-source transistors have gates connected in common to provide for ratioing of the currents produced.

9. In an IC chip as in claim 1, wherein the transistors of one of said sub-sets have emitter areas larger than the transistors of the other of said sub-sets;

said current means supplying currents to the transistors of said one sub-set of transistors which are smaller in magnitude than the currents supplied to the transistors of said other sub-set of transistors.

10. In an IC chip formed with a plurality of CMOS transistors together with a plurality of parasitic bipolar transistors having two current-carrying electrodes and a base electrode; a band-gap voltage reference comprising:

a plurality of selected pairs of said bipolar transistors;

said transistor pairs being divided into two sub-sets each comprising one transistor from each pair;

current means supplying to all of the transistors or said selected pairs controlled currents having magnitudes such that the current densities of the individual transistors of each pair are different;

one current-carrying electrode of each of said paired transistors being connected to the base electrode of another transistor of the same sub-set to form interconnected strings of transistors making up said sub-sets;

means connecting together like electrodes of two common-end transistors of each of said strings of transistors;

first and second MOS transistors connected respectively to the transistors at the ends of said strings of transistors which are opposite said common ends;

resistor means; and circuit means coupling said first and second MOS transistors to the ends of said resistor means respectively for developing a $\Delta V_{BE}$ voltage across said resistor means.

11. A voltage reference as claimed in claim 10, wherein said bipolar transistors are PNP types; and means connecting the emitters of the two transistors at said opposite ends of said strings to the gates of said first and second MOS transistors.

12. A voltage reference as claimed in claim 9, including third and fourth MOS transistors connected respectively in series with said first and second MOS transistors to serve as a current mirror to force the currents through said first and second MOS transistors to be the same.

13. A voltage reference as claimed in claim 12, including a fifth MOS transistor connected in series with said resistor means, with one current-carrying electrode connected directly to one end of said resistor means which is opposite the end to which said first MOS transistor is connected; and a sixth MOS transistor connected in series with said second MOS transistor, with one current-carrying electrode connected directly to a current-carrying electrode of said second MOS transistor;

whereby the potential at said opposite-end transistor connected to said second MOS transistor is effectively transferred to said one resistor means end, thereby to develop the net $\Delta V_{BE}$ voltage across said resistor means.

14. A voltage reference as claimed in claim 9, including third and fourth common-gate MOS transistors connected in series with said first and second MOS transistors, respectively, to serve as a current mirror to force the currents through said first and second MOS transistors to be equal;

a fifth MOS transistor to produce current ratioed with that of said first MOS transistor;

second resistor means connected in series with said fifth MOS transistor to produce a voltage proportional to $\Delta V_{BE}$, and second circuit means in series with said second resistor means to produce a $V_{BE}$ voltage to be added to said $\Delta V_{BE}$ voltage across said second resistor means;

whereby to develop a final output voltage having a low temperature coefficient.

15. A voltage reference as claimed in claim 14, wherein said second circuit means comprises an additional bipolar transistor connected in series with second resistor means.

16. A voltage reference as claimed in claim 15, including third resistor means connected between the base and emitter of said additional bipolar transistor; and fourth resistor means connected between the base and collector of said additional transistor.

17. A voltage reference as claimed in claim 14, including an additional bipolar transistor having its base connected to one end of said second resistor means; and an output terminal connected to the emitter of said additional bipolar transistor.

18. In an IC chip formed with a plurality of bipolar transistors each having two current-carrying electrodes and a base electrode; a band-gap voltage reference comprising:

a first set of pairs of said bipolar transistors of one polarity;

said first set of pairs being divided into first and second sub-sets each comprising one transistor from each pair;

first current means supplying to all of the transistors of said first set of pairs controlled currents having magnitudes such that the current densities of the individual transistors of each pair are different;

emitter electrodes of the transistors of said first and second sub-sets being connected to respective base electrodes of adjacent transistors of the same sub-set to form first and second interconnected strings of transistors making up said first and second sub-sets respectively;

means connecting together like electrodes of two common-end transistors of each of said first and second strings of transistors;

a second set of pairs of said bipolar transistors or polarity opposite said one polarity;

said second set of pairs being divided into third and fourth sub-sets each comprising one transistor from each pair;

second current means supplying to all of the transistors of said second set of pairs controlled currents having magnitudes such that the current densities of the individual transistors of each pair are different;

emitter electrodes of the transistors or said third and fourth sub sets being connected to respective base electrodes of adjacent transistors of the same sub-set to form third and fourth interconnected strings of transistors making up said third and fourth sub-sets;

means connecting the ends of said first and second strings which are opposite said common end to corresponding ends of said third and fourth strings of transistors; and circuit means connected to the two transistors at the ends of said third and fourth strings of transistors which are opposite said corresponding ends for developing a $\Delta V_{BE}$ voltage.

19. A voltage reference as claimed in claim 18, wherein said current means comprise MOS current source transistors having the same polarity as the bipolar transistors for which they supply current.

20. A voltage reference as claimed in claim 19, wherein said first and second strings of transistors are PNP type;

said current sources for said first and second strings of transistors comprising PMOS transistors.

21. In an IC chip formed with a plurality of CMOS transistors together with a plurality of parasitic bipolar transistors having two current-carrying electrodes and a base electrode; a band-gap voltage reference comprising:

a plurality of selected pairs of said bipolar transistors;

said transistor pairs being divided into two sub-sets each comprising one transistor from each pair;

the emitter areas of said first sub-set transistors being substantially different from the emitter areas of said second sub-set transistors;

first current means supplying to all of the transistors of said first sub-set controlled currents of predetermined magnitudes;

second current means supplying to all of the transistors of said second sub-set controlled currents of magnitudes substantially different from the current magnitudes of said first sub-set transistors and having such magnitudes that the current densities of the individual transistors of each pair are different;

one current-carrying electrode of each of said paired transistors being connected to the base electrode of another transistor of the same sub-set to form interconnected strings of transistors making up said sub-sets;

means connecting together like electrodes of two common-end transistors of each of said strings of transistors; and circuit means connected to the transistors at the ends of said strings of transistors which are opposite said common ends for developing a $\Delta V_{BE}$ voltage.

22. A voltage reference as claimed in claim 21, wherein the emitter areas of said first sub-set transistors are larger than the emitter areas of said second sub-set transistors; and the currents supplied to said first sub-set transistors are smaller than the currents supplied to said second sub-set transistors;

whereby the current densities of said first sub-set transistors are made substantially smaller than the current densities of said second sub-set transistors, both by the emitter area differentials and by the current differentials.

*23. In an IC chip formed with a plurality of CMOS transistors together with a plurality of parasitic bipolar transistors having two current-carrying electrodes and a base electrode; a band-gap voltage reference comprising:*

*a plurality of selected pairs of said bipolar transistors;*

*said transistor pairs being divided into two sub-sets each comprising one transistor from each of said pairs;*

*the emitter areas of said first sub-set transistors being substantially different from the emitter areas of said second sub-set transistors;*

*first current means supplying to all of the transistors of said first sub-set controlled currents of predetermined magnitudes;*

*second current means supplying to all of the transistors of said second sub-set controlled currents of magnitudes substantially different from the current magnitudes of said first sub-set transistors and having such magnitudes that the current densities of the individual transistors of each pair are different, one current-carrying electrode of each of said paired transistors being connected to the base electrode of another transistor of the same sub-set to form interconnected strings of transistors making up said sub-sets;*

*there being a first pair of common-end transistors represented by the transistors at one set of corresponding ends of said strings of transistors;*

*there being a second pair of common-end transistors represented by the transistors at the respective ends of said strings of transistors opposite said corresponding ends;*

*means intercoupling like electrodes of the two transistors of one of said pairs of common-end transistors of said strings of transistors in such a way that the potentials of said like electrodes track; and*

*circuit means coupled to the other of said pairs of common-end transistors for developing a* $\Delta V_{BE}$ voltage.

*24. The method of developing a reference voltage comprising:*

*interconnecting a first group of bipolar transistors in a first string to combine their* $V_{BE}$ voltages so as to develop a first cumulative $V_{BE}$ voltage;

*interconnecting a second group of bipolar transistors in a second string to combine their* $V_{BE}$ voltages so as to develop a second cumulative $V_{BE}$ voltage;

*there being for each of said first-group transistors a corresponding second-group transistor, thereby forming associated pairs of transistors;*

*the emitter area of each of said first-group transistors being different from the emitter area of the corresponding second-group transistor of the associated pair of transistors;*

*supplying to said first-group transistors currents of predetermined magnitudes;*

*supplying to said second-group transistors currents of predetermined magnitudes such that the current in one transistor of each of said associated pairs is different from the current in the other transistor of the associated pair;*

*intercoupling like electrodes of the two transistors which form an associated pair of transistors at one common end of said strings of transistors to provide that the electrode potentials track; and*

*coupling circuit means to the two transistors which form an associated pair at the other common end of said strings of transistors to develop a* $\Delta V_{BE}$ voltage.

* * * * *